United States Patent
Amin-Sanayei et al.

(10) Patent No.: US 11,643,484 B2
(45) Date of Patent: May 9, 2023

(54) MODIFIED FLUOROPOLYMERS

(71) Applicant: Arkema Inc., King of Prussia, PA (US)

(72) Inventors: Ramin Amin-Sanayei, Malvern, PA (US); Wensheng He, Wayne, PA (US); James F. Coffey, Broomall, PA (US); Chris Cavalier, Ambler, PA (US); Steven M. Baxter, Chalfont, PA (US); Sara Reynaud, King of Prussia, PA (US)

(73) Assignee: Arkema Inc., King of Prussia, PA (US)

( * ) Notice: Subject to any disclaimer, the term of this patent is extended or adjusted under 35 U.S.C. 154(b) by 0 days.

(21) Appl. No.: 15/557,977

(22) PCT Filed: Mar. 15, 2016

(86) PCT No.: PCT/US2016/022415
§ 371 (c)(1),
(2) Date: Sep. 13, 2017

(87) PCT Pub. No.: WO2016/149238
PCT Pub. Date: Sep. 22, 2016

(65) Prior Publication Data
US 2018/0072829 A1    Mar. 15, 2018

Related U.S. Application Data

(60) Provisional application No. 62/133,536, filed on Mar. 16, 2015.

(51) Int. Cl.
*C08F 114/22* (2006.01)
*C08F 2/38* (2006.01)
*C08F 214/22* (2006.01)

(52) U.S. Cl.
CPC .............. *C08F 114/22* (2013.01); *C08F 2/38* (2013.01); *C08F 214/222* (2013.01)

(58) Field of Classification Search
CPC ....... C08F 2/38; C08F 114/22; C08F 214/222
See application file for complete search history.

(56) References Cited

U.S. PATENT DOCUMENTS

| | | | | |
|---|---|---|---|---|
| 3,189,663 A * | 6/1965 | Nozaki | ............ | C08F 291/00 525/299 |
| 3,407,247 A * | 10/1968 | Reinhardt | ............ | C08F 291/00 525/273 |
| 3,748,295 A * | 7/1973 | Mikofalvy | ............ | D21H 17/39 524/807 |
| 5,264,530 A | 11/1993 | Darmon et al. | | |
| 5,362,826 A | 11/1994 | Berge et al. | | |
| 5,447,982 A | 9/1995 | Kamba et al. | | |
| 6,103,843 A * | 8/2000 | Abusleme | ............ | C08F 14/18 526/209 |
| 8,822,585 B2 * | 9/2014 | Bompart | ............ | C08F 265/00 524/458 |
| 9,074,025 B2 * | 7/2015 | Brothers | ............ | C08F 2/26 |
| 9,708,419 B2 * | 7/2017 | Ameduri | ............ | H01L 37/025 |
| 10,160,820 B2 * | 12/2018 | Amin-Sanayei | .... | C08F 214/225 |
| 2002/0115793 A1 * | 8/2002 | Gagne | ............ | C08F 293/00 525/133 |
| 2005/0107531 A1 * | 5/2005 | Claude | ............ | C08F 293/00 525/88 |
| 2006/0173131 A1 * | 8/2006 | Morikawa | ............ | C08F 214/18 525/102 |
| 2008/0081195 A1 * | 4/2008 | Chung | ............ | C08F 214/22 428/421 |
| 2009/0203864 A1 * | 8/2009 | Amin-Sanayei | ........ | C08F 14/28 526/216 |
| 2009/0221776 A1 | 9/2009 | Duraii et al. | | |
| 2009/0264539 A1 * | 10/2009 | Kocur | ............ | C08F 214/186 514/772.6 |
| 2010/0036053 A1 | 2/2010 | Aten et al. | | |
| 2012/0108756 A1 * | 5/2012 | Komatsu | ............ | C08F 259/08 525/244 |
| 2014/0154611 A1 * | 6/2014 | Ameduri | ............ | C08F 214/22 429/492 |

(Continued)

FOREIGN PATENT DOCUMENTS

| | | | |
|---|---|---|---|
| CN | 103450419 A | * 12/2013 | |
| EP | 0261942 A2 | * 3/1988 | ............ C08F 2/38 |

(Continued)

OTHER PUBLICATIONS

Jol et al. "New AB or ABA block copolymers: atom transfer radical polymerization (ATRP) of methyl methacrylate using iodine-terminated PVDFs as (macro)initiators", Polymer Bulletin, 2000, 44, 1-8. (Year: 2000).*

Voet et al. "Block copolymer route towards poly(vinylidene fluoride)/poly(methyacrylic acid)/nickel nanocomposites", RSC Advances, (2013),3(21),7938-7946. (Year: 2013).*

Laurelle et al. "Synthesis of Poly(vinylidene fluoride)-b-poly(styrene sulfonate) Block Copolymers by Controlled Radical Polymerizations", Journal of Polymer Science, Part A: Polymer Chemistry (2011), 49(18), 3960-3969. (Year: 2011).*

(Continued)

Primary Examiner — Nicole M. Buie-Hatcher

(74) Attorney, Agent, or Firm — Joanne Rossi

(57) ABSTRACT

The invention relates to fluoropolymers that have been modified with low molecular weight, polymeric chain transfer agents, and uses of the modified fluoropolymers. The modified fluoropolymers provide enhanced properties to the fluoropolymer, such as increased adhesion, and hydrophilic characteristics. The modified functional fluoropolymers are useful in many applications, including as binders in electrode-forming compositions and separator compositions, for hydrophilic membranes and hollow fiber membranes, as an aqueous and a solvent cast coating for baked decorative and protective coatings, and as a tie layer between a fluoropolymer layer and an incompatible polymer layer.

12 Claims, No Drawings

(56) References Cited

U.S. PATENT DOCUMENTS

| | | | |
|---|---|---|---|
| 2015/0017532 A1* | 1/2015 | Iguchi | H01M 4/623 252/182.1 |
| 2015/0079404 A1 | 3/2015 | Zheng et al. | |

FOREIGN PATENT DOCUMENTS

| | | | | |
|---|---|---|---|---|
| EP | 0638097 B1 | * | 3/2007 | ............... C08F 2/38 |
| FR | 2620712 A1 | * | 3/1989 | ........... C08F 259/08 |
| JP | 02225550 | | 9/1990 | |
| JP | 10120738 A | | 12/1998 | |
| JP | 6008333 B2 | * | 10/2016 | ........... G06K 7/146 |
| KR | 20140074540 A | * | 6/2014 | |
| WO | WO-2007018783 A2 | * | 2/2007 | ............. C08F 14/18 |
| WO | WO-2009093565 A1 | * | 7/2009 | ............... C08F 2/38 |
| WO | WO2012/125788 A2 | | 9/2012 | |
| WO | WO-2013111822 A1 | * | 8/2013 | ........... C08F 114/22 |
| WO | WO-2013124421 A1 | * | 8/2013 | ......... C08G 18/6275 |

OTHER PUBLICATIONS

Kostov et al. "First Amphiphilic Poly(vinylidene fluoride-co-3,3,3-trifluoropropene)-b-oligo(vinyl alcohol) Block Copolymers as Potential Nonpersistent Fluorosurfactants from Radical Polymerization Controlled by Xanthate", Macromolecules, 2011, 44(7), 1841-1855. (Year: 2011).*

Machine translation of CN 103450419 A, retrieved Mar. 2021 (Year: 2021).*

Voet, "Well-Defined Copolymers Based on Poly(vinylidene fluoride): From Preparation and Phase Separation to Application", Journal of Polymer Science, Part A: Polymer Chemistry 2014, 52, 2861-2877 (Year: 2014).*

Machine translation of JP 6008333 B2, retrieved Dec. 2022 (Year: 2022).*

Voet, "Block Copolymers based on poly(vinylidene fluoride)", J. Polym. Sci. Part A: Polym. Chem 2014, 52, 2861, retrieved from internet.

Kostov et al., "First Amphiphilic Poly(vinylidene fluoride-co3,3,3-trifluoropropene)-b-oligo (vinyl alcohol) Block Copolymers as Potential Nonpersistent Floursurfactants from Radical Polymerization Controlled by Xanthate", Macromolec, American Chemical Society, US, vol. 44, No. 7, Apr. 12, 2011, pp. 1841-1855.

Yogesh et al., "First RAFT/MADIX radical copolymerization of tert-butyl 2-trifluoromethacrylate with vinylidene fluoride controlled by xanthate", Polymer Chemistry, vol. 4, No. 9, Jan. 1, 2013, pp. 2783-2799.

IUPAC Compendium of Chemical Terminology Copyright ©2014 IUPAC.

* cited by examiner

MODIFIED FLUOROPOLYMERS

This application claims benefit, wader U.S.C. § 119 or § 365 of PCT Application Number PCT/US2016/022415, filed Mar. 15, 2016; and U.S. Provisional Application No. 62/133,536, filed Mar. 16, 2015; said applications incorporated herein by reference.

FIELD OF THE INVENTION

The invention relates to fluoropolymers that have been modified with low molecular weight, polymeric chain transfer agents, and uses of the modified fluoropolymers. The modified fluoropolymers provide enhanced properties to the fluoropolymer, such as increased adhesion, and hydrophilic characteristics. The modified functional fluoropolymers are useful in many applications, including as binders in electrode-forming compositions and separator compositions, for hydrophilic membranes and hollow fiber membranes, as an aqueous and a solvent cast coating for decorative and protective coatings, and as a tie layer between a fluoropolymer layer and an incompatible polymer layer.

BACKGROUND OF THE INVENTION

Fluoropolymers, for example those based on vinylidene fluoride $CF_2=CH_2$ (VDF) are known to have excellent mechanical stability properties, very great chemical inertness, low surface energy, electrochemical stability, and good aging resistance. These qualities are exploited in various end-use applications.

Unfortunately, the excellent properties provided by fluoropolymers can also limit the applications in which they can be used. For example, it is difficult to bond fluoropolymers or combine them with other materials.

Functional groups have been added to fluoropolymers in order to increase adhesion to other materials, add some level of hydrophilicity and wettability, and provide reactive sites, such as for cross-linking and subsequent chemical modification. Functionality has been added by several means, such as, by direct copolymerization of a functional monomer with the fluoromonomers, and by a post-polymerization grafting mechanism, such as the grafting of maleic anhydride onto a polyvinylidene fluoride homopolymer or copolymer, as described in U.S. Pat. No. 7,241,817, to form KYNAR® ADX resins available from Arkema Inc. WO 2013/110740 and U.S. Pat. No. 7,351,498 further describe functionalization of a fluoropolymer by monomer grafting or by copolymerization.

Chain transfer agents are commonly used to control the molecular weight of a polymer in free-radical polymerizations, including in the polymerization of fluoropolymers. A chain transfer agent acts by transferring an active center from a growing macromolecule to itself, thereby generating a new active polymer chain.

Chain transfer agents may be added all at once at the beginning of the reaction, or may be added in portions, or continuously throughout the course of the reaction, or a combination thereof. The amount of chain transfer added and its mode of addition depends on the desired molecular weight and modification of resultant fluoropolymer, but is normally used in an amount of from 0.1 to 25% based on total monomer weight used. If the level of chain transfer agent is too low, very high molecular weight polymer will form as insoluble gels.

Chain transfer agents are generally small molecules and those useful in the free-radical polymerization of fluoromonomers include: oxygenated compounds, for example, alcohols, carbonates, ketones, esters, and ethers, as described in U.S. Pat. No. 4,360,652; acetone, as described in U.S. Pat. No. 3,857,827; ethyl acetate, and diethylcarbonate.

Other classes of compounds which may serve as chain-transfer agents in the polymerization of halogen-containing monomers include, for example, halocarbons and hydrohalocarbons, such as chlorocarbons, hydrochlorocarbons, chlorofluorocarbons and hydrochlorofluorocarbons. For example trichlorofluoromethane is described in U.S. Pat. No. 4,569,978; and ethane and propane in U.S. Pat. Nos. 6,649,720 and 6,734,264.

U.S. Pat. No. 8,697,822 describes the use of very low levels of polyvinylphosphonic acid, polyacrylic acid, polyvinyl sulfonic acids and their salts as surfactants for preparing fluoropolymers. No improvement in adhesion or molecular weight regulation are taught or suggested, and would not be provided at the very low levels of surfactants exemplified.

Surprisingly it has now been found that low molecular weight functionalized polymer chain transfer agents can be used in the polymerization of fluoromonomers, as a means of both controlling the fluoropolymer molecular weight, and also providing improved properties to the fluoropolymer.

SUMMARY OF THE INVENTION

The invention relates to a modified fluoropolymer comprising fluoromonomer units and from 0.1 to 25 weight percent of residual functional groups, based on the total amount of monomer, wherein said residual functional groups come from one or more low molecular weight polymeric functional chain transfer agents.

The invention further relates to a process for forming the modified fluoropolymer using one or more low molecular weight polymeric functional chain transfer agents.

The invention further relates to articles formed from the modified polymer, which benefit from the special properties of the modified polymer. These articles find uses in applications such as for: an electrode or separator for a battery or capacitor, a hydrophilic porous membrane or hollow fiber membrane; an article coated on at least one surface with said modified fluoropolymer, impregnation of woven and unwoven fibers, and a multi-layer construction wherein said modified fluoropolymer forms a tie layer between a fluoropolymer layer and a polymer layer that is incompatible with said fluoropolymer layer.

DETAILED DESCRIPTION OF THE INVENTION

All references cited herein are incorporated by reference. Unless otherwise stated, all molecular weights are weight average molecular weights as determined by Gas Permeation Chromatography (GPC), and all percentages are percentage by weight.

The term "copolymer" as used herein indicates a polymer composed of two or more different monomer units, including two comonomers, terpolymers, and polymers having 3 or more different monomers. The copolymers may be random, alternating, or block, may be heterogeneous or homogeneous, may be linear, branched, comb or star polymers, and may be synthesized by a batch, semi-batch or continuous process.

The invention relates to a fluoropolymer that has been modified by a low molecular weight, functional, polymer chain transfer agent, and the uses of these modified fluoropolymers Functional Chain Transfer Agents The functional chain transfer agents of the invention are low molecular weight functional polymers. By low molecular weight is meant a polymer with a degree of polymerization of less than or equal to 1,000, and preferably less than 800. In a preferred embodiment, the weight average molecular weight of the polymeric chain transfer agent, as measured by GPC, is 20,000 g/mole of less, more preferably 15,000 g/mole, and more preferably less than 10,000 g/mole. In one embodiment the weight average molecular weight is less than 5,000 g/mole. The low molecular weight functional chain transfer agent is a polymer or an oligomer having two or more monomer units, and preferably at three or more monomer units.

By functional polymeric chain transfer agents, as used in the invention, is meant that the low molecular weight polymer chain transfer agent contains one or more different functional groups. The chain transfer agent has the formula (CH2-CH—(X)—R)y where y is a integer of between 2 to 1000, X is a linking group including, but not limited to, a covalent or ionic bond, an alkyl, alkene, alkyne, substituted alkyl, substituted alkene, aryl, ester, ether, ketone, amine, amid, amide, organo-silane, and R is a functional group.

The functional group (R) provides functionality, and can be provided by the polymerization of functional monomers—either as the sole monomer, or as a comonomer. The functionality could also be added by a post-polymerization reaction or grafting. Useful functional groups include, but are not limited to, carboxylic, hydroxyl, siloxane, ether, ester, sulfonic, phosphoric, phosphonic, sulfuric, amide and epoxy groups, or a mixture thereof. Useful functional chain transfer agents of the invention include, but are not limited to, polyacrylic acid, polylactic acid, polyphosphonic acid, polysulfonic acid, and polymaleic acid. In the case of acid groups, the functional groups may be partially or fully neutralized and/or esterified.

The low molecular weight functional chain transfer agent is present in the polymerization reaction at from 0.1 to 25 percent by weight, based on the total amount of monomer. Preferably the level is from 0.25 to 15 percent by weight, more preferably from 0.5 to 10 weight percent. In one embodiment, the level of the chain transfer agent is from greater than 2 weight percent, to 10 weight percent, and even 2.2 to 8 weight percent. If the level of the functionalized chain transfer agent is too low, there is not enough functionality provided to the fluoropolymer to provide any significant performance advantage, nor enough to obtain the desired molecular weight.

The low molecular weight polymeric functional chain transfer agent reacts with the active center of the growing polymer chain, resulting in the extraction of the H of the CH and the attachment of the residual low molecular weight functional group to the polymer chain. This polymeric chain transfer agent differs from a comonomer, in that it does not disrupt the sequencing distribution of the fluoropolymer backbone. The presence of the residual low molecular weight functional polymer chain transfer agent residual, can be detected in the fluoropolymer by means of NMR.

In addition to the low molecular weight, functional chain transfer agent of the invention, other chain transfer agents typically used in the polymerization of fluoropolymers may also be added at levels to provide the desired molecular weight.

In general, a portion of, or all of the low molecular weight chain transfer agent is added to the initial charge, to prevent the formation of extremely high molecular weight polymer that is non-soluble in polar solvents—and which exists as gels. The remainder of the chain transfer agent can then be added continuously, or in small portions through the remainder of the polymerization.

In a preferred embodiment, the chain transfer agent is used in conjunction with a surfactant to stabilized the growing polymer chains. The surfactant can be any surfactant known to stabilize fluoropolymers, and can be one or more fluorinated surfactants, one or more non-fluorinated surfactants, or a mixture of fluorinated and non-fluorinated surfactants. In a preferred embodiment, the polymerization is carried out without any fluorinated surfactant, as has been shown by Applicant in previous patent applications. Useful non-fluorinated surfactant can produce stable emulsions having a particle size in the range of from 50 to 250 nm.

Fluoropolymer

Fluoropolymers, as used according to the invention, means a polymer formed from one or more fluorinated and olefinically unsaturated monomers capable of undergoing free radical polymerization. Suitable exemplary fluoromonomers for use according to the invention include, but are not limited to, vinylidene fluoride (VDF), vinyl fluoride (VF), trifluoroethylene, tetrafluoroethylene (TFE), ethylene tetrafluoroethylene, chlorotrifluoroethylene (CTFE) and hexafluoropropylene (HFP), 3,3,3-trifluoropropene, 2,3,3,3-tetrafluoropropene, perfluoro-methyl vinyl ethers (PMVE), perfluoro-propyl vinyl ethers (PPMVE) and mixtures thereof. The fluoropolymer of the invention may also include monomers that are not fluorinated, such as for example ethylene, as used to form ethylene tetrafluoroethylene (ETFE), and ethylene-co-chlorotrifluoroethylene (ECTFE).

The term "vinylidene fluoride polymer" or "PVDF-based polymers" used herein includes both normally high molecular weight homopolymers and copolymers (meaning two or more types of monomer units) within its meaning. Such copolymers include those containing at least 50 mole percent, and preferably at least 65 mole percent of vinylidene fluoride copolymerized with at least one comonomer, such as, but not limited to: tetrafluoroethylene, trifluoroethylene, chlorotrifluoroethylene, hexafluoropropene, 2,3,3,3-tetrafluoro-propene, 3,3,3-trifluoro-propene, vinyl fluoride, pentafluoropropene, perfluoromethyl vinyl ether, perfluoropropyl vinyl ether and any other monomer that would readily copolymerize with vinylidene fluoride.

Particularly preferred copolymers are those composed of from at least about 70 and up to 99 mole percent vinylidene fluoride, and correspondingly from 1 to 30 percent tetrafluoroethylene, such as disclosed in British Patent No. 827,308; about 70 to 99 percent vinylidene fluoride and 1 to 30 percent hexafluoropropene (see for example U.S. Pat. No. 6,586,547); and about 70 to 99 mole percent vinylidene fluoride and 1 to 30 mole percent trifluoroethylene, 2,3,3,3-tetrafluoro-propene, and/or 3,3,3-trifluoro-propene. Terpolymers of vinylidene fluoride with hexafluoropropene and tetrafluoroethylene such as described in U.S. Pat. No. 2,968,649 are also preferred.

While the invention contemplates the polymerization of any fluoropolymer, the polymerization of PVDF will be used to illustrate the invention. One of ordinary skill in the art will be able to apply the teaching of the invention to other fluoromonomers systems, based on the teaching and Examples provided herein.

Polymerization Process

With respect to the preferred method of making the fluoropolymer of the present invention, initially, deionized water, at least one surfactant—typically at a level of from 0.01 to less than 2.0 weight percent based on the amount of monomer, preferably non-fluorinated surfactant, and a portion of the low molecular weight functional polymer chain transfer agent are introduced into a reactor followed by deoxygenation. After the reactor reaches the desired temperature, vinylidene fluoride (VDF) monomer and optional comonomer is added to the reactor to reach a predetermined pressure. Next a free radical initiator is introduced to the reactor with suitable flow rate to maintain proper polymerization rate. Once the reaction has started or simultaneously with the beginning of the reaction, the rest of low molecular weight functional polymer chain transfer agent and fluoromonomer(s) are continuously fed at a desired ratio into the reactor. After reaching the desired polymer solids level, the feed of the monomers can be stopped but the charge of the initiator is preferably maintained to consume any residual monomers in the reactor. The initiator charge can then be stopped, the reactor pressure dropped and the reactor cooled. The unreacted monomers can be vented and the fluoropolymer collected through a drain port or other collection means. The fluoropolymer can then be isolated using standard isolation techniques such as oven drying, spray drying, shear or acid coagulation followed by drying and so on, or the functional fluoropolymer may be kept in the emulsion form for subsequent applications.

Properties

The fluoropolymer formed using the low molecular weight functional chain transfer agent of the invention generally has a solution viscosity greater than 10 cp in 5% NMP solution. The low molecular weight polymeric chain transfer residue remains a part of the fluoropolymer, and provides a functionality capable of enhancing the properties of the fluoropolymer. The functionality provides sites for further reaction, including crosslinking, enhances the hydrophilicity of the fluoropolymer, and improves adhesion of the fluoropolymer to a variety of substrates, especially to metals and metal oxides, and has excellent chemical and electrochemical stability. While not being bound by any theory, it is believed that the polymeric chain transfer agent residue concentrates functionality at the fluoropolymer chain ends, potentially making the functionality less hindered than found in other methods of functionalization. The structure formed could take on the appearance of a block copolymer, having one or more fluoropolymer blocks and one or more blocks of the polymeric chain transfer agent residue.

The fluoropolymer of this invention would have both the properties (adhesion, hydrophilicity, cross-linkability) of the functional group, combined with water and chemical resistant of vinylidene fluoride resin which makes it unique and suitable for manufacturing a wide variety of useful articles having unique properties.

Uses:

Fluoropolymers of the invention containing the residual functionality from the chain transfer agent can find multiple end uses. One of ordinary skill in the art can imagine many uses for the functionalized fluoropolymer, based on the following non-limiting examples.

In one embodiment, the functionalized fluoropolymer can be used as a binder in an electrode-forming composition and/or in a separator component. The coated electrode and separator could be used in forming a lithium ion battery, non-aqueous solvent-type secondary battery, or in a capacitor. In this application, the fluoropolymer is preferably made in a process without any fluorosurfactant, and the latex exhibits good shelf stability. If needed, anti-settling agent(s) or surfactant(s), is diluted in water and post-added to the PVDF dispersion latex with stirring, in order to provide further storage stability for the latex. To this PVDF latex one or more optional additives can be added, with stirring. The pH also can be adjusted, if needed, for the thickener to be effective. The electrode-forming powdery material(s) and other ingredients are then added to the mixture. It may be advantageous to disperse the electrode-forming powdery material(s) in the organic carbonate, the latent solvent, wetting agent, or water to provide wetting of the powdery materials prior to admixing with the aqueous PVDF binder formulation. The final composition is then subjected to a high shear mixing to ensure uniform distribution of the powdery material in the composition. The final aqueous composition of the invention should have a viscosity useful for casting or coating onto a substrate. The useful viscosity is in the range of from 2,000 to 20,000 cps at 20 rpm, and 25° C. depending on application methods.

The fluoropolymer of invention can be isolated by usual means, such as spry drying, oven drying, or others. Then isolated resin can be used as binder in a solution cast process to fabricate electrodes (both cathode and anode). The slurry is comprised binder, solvent (usually NMP), active powdery material, and conductive carbon. The useful viscosity is in the range of from 2,000 to 20,000 cps at 20 rpm, and 25° C. depending on application methods.

The slurry is applied onto at least one surface, and preferably both face surfaces, of an electroconductive substrate by means known in the art, such as by brush, roller, ink jet, squeegee, foam applicator, curtain coating, vacuum coating, or spraying. The electroconductive substrate is generally thin, and usually consists of a foil, mesh or net of a metal, such as aluminum, copper, lithium, iron, stainless steel, nickel, titanium, or silver. The coated electroconductive substrate is then dried to form a coherent composite electrode layer that may then be calendared, providing an interconnected composite electrode usable in a non-aqueous-type battery.

In another embodiment, the functional PVDF-based polymer can be used to fabricate porous membranes and hollow fibers having improved hydrophilic characteristics.

In another embodiment the functionalized PVDF-based polymer of this invention can be directly used in making an aqueous based coating for use in a waterborne decorative and/or protective coating on different substrates, including metals, ceramics, glass. Such a coating made of the functionalized fluoropolymer of the invention provides a crack-resistant, highly-weatherable, chemical resistant, dirt-shedding protective coating to many types of finished articles, including but not limited to, metals, ceramics, pipe, architectural structures, metal window frames, metal sheets and coils, fiberglass fabrics, textiles, marble, glass, china, and brick. The polymer of the invention can also be used to produce a high-shear stable aqueous fluoropolymer coating compositions, preferably using polyvinylidene fluoride (PVDF), such as KYNAR® PVDF, suitable for high performance coating applications. The high-shear stable aqueous coatings which can be applied on variety of substrates such as metal or ceramic surfaces, and in the impregnation of textiles, glass, carbon or aramid fibers, etc. The dry coating formed from the coating composition of the invention exhibits improved adhesion to substrate.

In still another embodiment, the functionalized PVDF-based polymer of this invention can be used as tie layer between fluoropolymers and other incompatible polymers. It can be melt processed via a multi-layer extrusion or injection molding machines to improve bonding adhesion between a fluoropolymer and other polymers to improve physical and/or chemical properties and reduce cost since fluoropolymers are generally expensive.

EXAMPLES

The following examples further illustrate the best mode contemplated by the inventors for the practice of their invention and should be considered as illustrative and not in limitation thereof.

Crystallinity (ΔH) is calculated from the heat of fusion, which in turn is calculated from any endotherms detected in a differential scanning calorimeter (DSC) scan. The melting temperature (Tm) is assigned to peak of endotherms.

The DSC scan measuring the crystalline content is performed according to ASTM D 451-97 using a Perkin Elmer 7 DSC apparatus with an Intercooler II attachment. The instrument is equipped with a dry box with an N2 purge through the dry box. Specimens of 9 to 10 mg are used and crimped in aluminum pans. The DSC run is performed in a three steps cycle. The cycle is begun at −125° C. followed by a 10° C./min ramp to 210° C. with a 10 minute hold. The sample is then cooled at a rate of 10° C./min to −125° C. and then heated at the 10° C./min rate to 210° C.

Modified fluoropolymer of this invention was dissolved in 1-methyl-2-pyrrolidone (NMP) at 5 wt % and apparent viscosity was measured via the following method. 2+0.01 g of resin was added to a 60 ml glass jar containing 38+0.19 g of NMP. The jar was closed and shaken to disperse resin in NMP. The suspension was allowed to mix on a WHEATON 120 VAC Mini Bench Top Roller (Model: W348923-A) at 50% speed for 72 hours until dissolved. After dissolution, 9.4 ml of solution was placed in the Small Sample Adapter sample cup (SC4-13RP) of Brookfield Viscometer (Model: LVDV-II+ Pro). During measurement, a circulation bath kept the sample at 25° C.

Peel strengths for cathodes were obtained via a 180° peel test using ASTM D903 with three modifications. The first modification was that the extension rate used was 50 mm/minute (peel rate of 25 mm/minute). The second modification was that there was no two week conditioning period at a controlled humidity and temperature. Cathodes were tested one day after fabrication. The third modification was that the cathode was bonded to the alignment plate via 3M's 410M double sided paper tape with the flexible aluminum foil current collector peeled by the testing machine's grips.

Solution viscosity and rhelogical properties are measured at ambient temperature under different shear rates by using a TA ARES-G2 rotational rheometer with stainless steel 27.7 mm Dia DIN concentric cylinder geometry. The temperature is kept constant and equal to 25.0±0.1° C. by using a Peltier Temperature Control System. The torque and normal force generated by the sample is measured with a Force Rebalance Transducer. Selection of torque range and calculation of viscosity values are performed using the TRIOS software.

Flow Curves are generated by increasing shear rates in logarithmic steps from 0.1 l/s to 100 l/s acquiring 5 points per decade.

Examples 1

Into an 80-gallon stainless steel reactor was charged, 345 lbs of deionized water, 66 grams of a poly(ethylene glycol)-block-poly(propylene glycol)-block-poly(ethylene glycol) non-ionic surfactant having a Mn of about 2,900 g/mol., and 5.5 lbs of 10% aqueous solution NOVERITE K-752 (a partially neutralized low molecular weight water soluble acrylic acid polymer, weight average molecular weight by aqueous GPC of 2,000, from Lubrizol) as the chain transfer agent. Following evacuation, agitation was begun at 23 rpm and the reactor was heated. After the reactor temperature reached the desired set point of 100° C., the vinylidene fluoride (VDF) charge was started. Reactor pressure was then raised to 650 psi by charging approximately 35 lbs VDF into the reactor. After the reactor pressure was stabilized, 4.5 lbs of initiator solution made of 1.0 wt % potassium persulfate and 1.0 wt % sodium acetate was added to the reactor to initiate polymerization. The rate of further addition of the initiator solution was adjusted to obtain and maintain a final VDF polymerization rate of roughly 60 pounds per hour. The VDF polymerization was continued until approximately 165 pounds VDF was introduced in the reaction mass along with 11.0 lbs of 10% aqueous solution NOVERITE K-752. The VDF feed was stopped and the batch was allowed to react-out at the reaction temperature to consume residual monomer at decreasing pressure while initiator feed was maintained. After 25 minutes, the agitation was stopped and the reactor was cooled, vented and the latex recovered. Solids in the recovered latex were determined by gravimetric technique and were about 30 weight % and solution viscosity at 5% in NMP was measured at shear rate of 10 $sec^{-1}$ to be 250 cp. The melting temperature and heat of fusion of resin were measured in accordance with ASTM method D-3418.

Examples 2

Into an 80-gallon stainless steel reactor was charged, 345 lbs of deionized water, 66 grams of a poly(ethylene glycol)-block-poly(propylene glycol)-block-poly(ethylene glycol) non-ionic surfactant having a Mn of about 2,900 g/mol., and 3.0 lbs of 10% aqueous solution NOVERITE as chain transfer agent. Following evacuation, agitation was begun at 23 rpm and the reactor was heated. After the reactor temperature reached the desired set point of 100° C., the vinylidene fluoride (VDF) charge was started. Reactor pressure was then raised to 650 psi by charging approximately 35 lbs VDF into the reactor. After reactor pressure was stabilized, 4.5 lbs of initiator solution made of 1.0 wt % potassium persulfate and 1.0 wt % sodium acetate was added to the reactor to initiate polymerization. The rate of further addition of the initiator solution was adjusted to obtain and maintain a final VDF polymerization rate of roughly 60 pounds per hour. The VDF polymerization was continued until approximately 165 pounds VDF was introduced in the reaction mass along with 5.2 lbs of 10% aqueous solution NOVERITE K-752. The VDF feed was stopped and the batch was allowed to react-out at the reaction temperature to consume residual monomer at decreasing pressure while initiator feed was maintained. After 25 minutes, the agitation was stopped and the reactor was cooled, vented and the latex recovered. Solids in the recovered latex were determined by gravimetric technique and were about 30 weight % and solution viscosity at 5% in NMP was measured at shear rate of 10 $sec^{-1}$ to be 430 cp. The melting temperature and heat of fusion of resin were measured in accordance with ASTM method D-3418.

Examples 3

Into an 80-gallon stainless steel reactor was charged, 345 lbs of deionized water, 66 grams of a poly(ethylene glycol)- block-poly(propylene glycol)-block-poly(ethylene glycol) non-ionic surfactant having a Mn of about 2,900 g/mol., and 1.5 lbs of 10% aqueous solution NOVERITE K-752 as chain transfer agent. Following evacuation, agitation was begun at 23 rpm and the reactor was heated. After the reactor temperature reached the desired set point of 100° C., the vinylidene fluoride (VDF) charge was started. Reactor pressure was then raised to 650 psi by charging approximately 35 lbs VDF into the reactor. After reactor pressure was stabilized, 4.5 lbs of initiator solution made of 1.0 wt % potassium persulfate and 1.0 wt % sodium acetate was added to the reactor to initiate polymerization. The rate of further addition of the initiator solution was adjusted to obtain and maintain a final VDF polymerization rate of roughly 60 pounds per hour. The VDF polymerization was continued until approximately 165 pounds VDF was introduced in the reaction mass. The VDF feed was stopped and the batch was allowed to react-out at the reaction temperature to consume residual monomer at decreasing pressure while initiator feed was maintained. After 25 minutes, the agitation was stopped and the reactor was cooled, vented and the latex recovered. Solids in the recovered latex were determined by gravimetric technique and were about 30 weight % and solution viscosity at 5% in NMP was measured at shear rate of 10 $\sec^{-1}$ to be 950 cp. The melting temperature and heat of fusion of resin were measured in accordance with ASTM method D-3418.

Examples 4

Into an 80-gallon stainless steel reactor was charged, 345 lbs of deionized water, 66 grams of a poly(ethylene glycol)-block-poly(propylene glycol)-block-poly(ethylene glycol) non-ionic surfactant having a Mn of about 2,900 g/mol., and 300 gr of 50% aqueous solution Sokalon cp-10s (from BASF) as chain transfer agent. Following evacuation, agitation was begun at 23 rpm and the reactor was heated. After the reactor temperature reached the desired set point of 100° C., the vinylidene fluoride (VDF) charge was started. Reactor pressure was then raised to 650 psi by charging approximately 35 lbs VDF into the reactor. After reactor pressure was stabilized, 2.9 lbs of initiator solution made of 1.0 wt % potassium persulfate and 1.85 wt % Sokalon cp-10s (from BASF) was added to the reactor to initiate polymerization. The rate of further addition of the initiator solution was adjusted to obtain and maintain a final VDF polymerization rate of roughly 60 pounds per hour. The VDF polymerization was continued until approximately 165 pounds VDF was introduced in the reaction mass. The VDF feed was stopped and the batch was allowed to react-out at the reaction temperature to consume residual monomer at decreasing pressure while initiator feed was maintained. After 25 minutes, the agitation was stopped and the reactor was cooled, vented and the latex recovered. Solids in the recovered latex were determined by gravimetric technique and were about 30 weight % and solution viscosity at 5% in NMP was measured at shear rate of 10 $\sec^{-1}$ to be 320 cp. The melting temperature and heat of fusion of resin were measured in accordance with ASTM method D-3418.

Comparative Example 4

Into an 80-gallon stainless steel reactor was charged, 345 lbs of deionized water and 90 grams of a poly(ethylene glycol)-block-poly(propylene glycol)-block-poly(ethylene glycol) non-ionic surfactant having a Mn of about 2,900 g/mol. Following evacuation, agitation was begun at 23 rpm and the reactor was heated. After the reactor temperature reached the desired set point of 83° C., 0.015 lb of propane as chain transfer agent was added to reactor and the vinylidene fluoride (VDF) charge was started. Reactor pressure was then raised to 650 psi by charging approximately 35 lbs VDF into the reactor. After reactor pressure was stabilized, 6.0 lbs of initiator solution made of 0.5 wt % potassium persulfate and 0.5 wt % sodium acetate was added to the reactor to initiate polymerization. The rate of further addition of the initiator solution was adjusted to obtain and maintain a final VDF polymerization rate of roughly 60 pounds per hour. The VDF polymerization was continued until approximately 150 pounds VDF was introduced in the reaction mass. The VDF feed was stopped and the batch was allowed to react-out at the reaction temperature to consume residual monomer at decreasing pressure while initiator feed was maintained. After 25 minutes, the agitation was stopped and the reactor was cooled, vented and the latex recovered. Solids in the recovered latex were determined by gravimetric technique and were about 27 weight % and solution viscosity at 5% in NMP was measured at shear rate of 10 (sec-1) to be about 800 cp. The melting temperature and heat of fusion of resin were measured in accordance with ASTM method D-3418.

Comparative Example 5

Into an 80-gallon stainless steel reactor was charged, 345 lbs of deionized water and 60 grams of a poly(ethylene glycol)-block-poly(propylene glycol)-block-poly(ethylene glycol) non-ionic surfactant having a Mn of about 2,900 g/mol. Following evacuation, agitation was begun at 23 rpm and the reactor was heated. After the reactor temperature reached the desired set point of 83° C., 0.203 lb of propane was added as chain transfer agent to reactor and the vinylidene fluoride (VDF) charge was started. Reactor pressure was then raised to 650 psi by charging approximately 35 lbs VDF into the reactor. After reactor pressure was stabilized, 6.0 lbs of initiator solution made of 0.5 wt % potassium persulfate and 0.5 wt % sodium acetate was added to the reactor to initiate polymerization. The rate of further addition of the initiator solution was adjusted to obtain and maintain a final VDF polymerization rate of roughly 60 pounds per hour. The VDF polymerization was continued until approximately 180 pounds VDF was introduced in the reaction mass. The VDF feed was stopped and the batch was allowed to react-out at the reaction temperature to consume residual monomer at decreasing pressure while initiator feed was maintained. After 25 minutes, the agitation was stopped and the reactor was cooled, vented and the latex recovered. Solids in the recovered latex were determined by gravimetric technique and were about 33 weight % and solution viscosity at 5% in NMP was measured at shear rate of 10 (sec-1) to be about 500 cp. The melting temperature and heat of fusion of resin were measured in accordance with ASTM method D-3418.

Comparative Example 6

An aqueous solution of PAA (NOVERITE K-752) was added to an aqueous PVDF from example 5 to achieve 1% PAA based on solids. The blend was isolated by placing it in convection oven at 70° C. overnight. The melting temperature and heat of fusion of dried blended resin were measured in accordance with ASTM method D-3418.

TABLE 1

| Sample # | CTA type | CTA loading (lb) | Solution Viscosity 5% in NMP@ 10 1/s | Electrode Adhesion (N/m) |
|---|---|---|---|---|
| 1- | PAA | 1.65 | 250 | 121 |
| 2- | PAA | 0.82 | 430 | 133 |
| 3- | PAA | 0.15 | 950 | 146 |
| 4- | PAA (partial ester) | 0.66 | 300 | 65 |
| 5-(comp.) | propane | 0.015 | 820 | 196 |
| 6-(comp.) | propane | 0.23 | 510 | 17 |
| 7 (comp.) | propane | 0.23 | 510 | 15 |

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Aspects of the invention include:

1. A modified fluoropolymer comprising fluoromonomer units and from 0.1 to 25 weight percent, preferably from greater than 2 to 15 weight percent, and most preferably from 2.2 to 10 weight percent of residual functional groups, based on the total amount of monomer, wherein said residual functional groups in the modified fluoropolymer comprise residual functional groups from one or more low molecular weight polymeric functional chain transfer agents.

2. The modified fluoropolymer of aspect 1, wherein said modified fluoropolymer comprises one or more fluoropolymer blocks and one or more blocks of said residual functional groups of the low molecular weight polymeric functional chain transfer agent.

3. The modified fluoropolymer of aspect 1 or aspect 2, wherein said low molecular weight polymeric functional chain transfer agents have molecular weights of less than 20,000 g/mole.

4. The modified fluoropolymer of any of aspects 1 to 3, wherein said residual functional groups comprise a functionality selected from the group consisting of carboxylic, hydroxyl, siloxane, ester, ether, sulfonic, phosphoric, phosphonic, sulfuric, amide, and epoxy groups, or a mixture thereof.

5. The modified fluoropolymer of any of aspects 1 to 4, wherein said fluoromonomer units are selected from the group consisting of vinylidene fluoride (VDF), vinyl fluoride (VF), trifluoroethylene, tetrafluoroethylene (TFE), ethylene tetrafluoroethylene, chlorotrifluoroethylene (CTFE) and hexafluoropropylene (HFP), 3,3,3-trifluoropropene, 2,3,3,3-tetrafluoropropene, ethylene and mixtures thereof.

6. The modified fluoropolymer composition of any of aspects 1 to 5, wherein said fluoropolymer is a homopolymer of vinylidene fluoride or a copolymer of 71 to 99 weight percent vinylidene fluoride and 1 to 29 weight percent of one or more other fluoromonomers.

7. A process for forming a functionalized fluoropolymer comprising the steps of
 a) forming an aqueous emulsion comprising at least one radical initiator, at least one functional, low molecular weight polymeric chain transfer agent, at least one surfactant, and at least one fluoromonomer,
 b) initiating polymerization of said at least one fluoromonomer,
 c) optionally adding a delayed feed comprising fluoromonomer, initiator and optionally low molecular weight polymeric functional chain transfer agent, and
 d) continuing polymerization to form a functionalized fluoropolymer.

8. The process of aspect 7, wherein said process uses no fluorosurfactant.

9. The process of aspect 7 or aspect 8 wherein said functional chain transfer agent is present in a total amount from about 0.1 to 25 weight percent, preferably from 2.0 to 15 weight percent, and more preferably from 2.2 to 10 weight percent, based on total monomer.

10. The process of any of aspects 7 to 9 wherein said at least one fluoromonomer is selected from the group consisting of vinylidene fluoride (VDF), vinyl fluoride (VF), trifluoroethylene, tetrafluoroethylene (TFE), ethylene tetrafluoroethylene, chlorotrifluoroethylene (CTFE) and hexafluoropropylene (HFP), 3,3,3-trifluoropropene, 2,3,3,3-tetrafluoropropene, and mixtures thereof.

11. The process of any of aspects 7 to 10, wherein said fluoropolymer is a homopolymer of vinylidene fluoride or a copolymer of 71 to 99 weight percent vinylidene fluoride and 1 to 29 weight percent of one or more other fluoromonomers.

12. An article formed from the modified fluoropolymer of any of claims claim 1 to 6, or made by the process of any of claims 7 to 11.

13. The article of aspect 12, wherein said article is selected from the group consisting of an electrode or separator component for a battery or capacitor, a porous membrane or hollow fiber membrane; an article coated on at least one surface with said modified fluoropolymer, and a multi-layer construction wherein said modified fluoropolymer forms a tie layer between a fluoropolymer layer and a polymer layer that is incompatible with said fluoropolymer layer.

What is claimed:

1. A modified fluoropolymer comprising fluoromonomer units which forms one or more polymer chains and from 0.1 to 25 weight percent of residual low molecular weight functional chain transfer agent, based on the total amount of monomer, wherein said low molecular weight functional chain transfer agent is polymeric and comprises functional groups selected from the group consisting of carboxylic, hydroxyl, siloxane, ester, ether, sulfonic, phosphoric, phosphonic, sulfuric, amide, and epoxy groups, or a mixture thereof, said chain transfer agent having weight average molecular weight of less than 20,000,
 wherein the chain transfer agent is not a monomer and wherein the chain transfer agent does not disrupt the sequencing distribution of the monomers and wherein the modified fluoropolymer has a solution viscosity of greater than 10 cp at 5% weight percent in NMP.

2. The modified fluoropolymer of claim 1, wherein said modified fluoropolymer comprises greater than 2 to 15 weight percent of said residual low molecular weight functional chain transfer agent.

3. The modified fluoropolymer of claim 1, wherein said modified fluoropolymer comprises from 2.2 to 10 weight percent of said residual low molecular weight functional chain transfer agent.

4. The modified fluoropolymer of claim 1, wherein said modified fluoropolymer comprises one or more fluoropolymer blocks and one or more blocks of said residual low molecular weight functional chain transfer agent.

5. The modified fluoropolymer of claim 1, wherein said low molecular weight functional chain transfer agents has weight average molecular weights of less than 10,000 g/mole.

6. The modified fluoropolymer of claim 1, wherein said fluoromonomer units are selected from the group consisting of vinylidene fluoride (VDF), vinyl fluoride (VF), trifluoroethylene, tetrafluoroethylene (TFE), chlorotrifluoroethylene (CTFE) and hexafluoropropylene (HFP), 3,3,3-trifluoropropene, 2,3,3,3-tetrafluoropropene, and mixtures thereof.

7. The modified fluoropolymer of claim 6, wherein said fluoropolymer chain is a homopolymer of vinylidene fluoride or a copolymer of 71 to 99 weight percent vinylidene fluoride and 1 to 29 weight percent of one or more other fluoromonomers.

8. An article formed from the modified fluoropolymer of claim 1.

9. The article of claim 8, wherein said article is selected from the group consisting of an electrode or separator component for a battery or capacitor; a porous membrane or hollow fiber membrane; an article coated on at least one surface with said modified fluoropolymer, and a multi-layer construction wherein said modified fluoropolymer forms a tie layer between a fluoropolymer layer and a polymer layer that is incompatible with said fluoropolymer layer.

10. The modified fluoropolymer of claim 1, wherein said modified fluoropolymer comprises 85 to 99.9 weight percent of a polyvinylidene fluoride homopolymer or copolymer chain, and from 0.01 to 15 weight percent of residual low molecular weight functional chain transfer agent at one or more ends of the polyvinylidene fluoride homopolymer or copolymer chain and wherein said residual low molecular weight functional chain transfer agent is poly(meth)acrylic acid.

11. The modified fluoropolymer of claim 1, wherein the functionality on said residual low molecular weight functional chain transfer agent is selected from the group consisting of hydroxyl, ester, ether, phosphoric, sulfuric, amide, and epoxy groups, or a mixture thereof.

12. A modified fluoropolymer comprising fluoromonomer units, wherein at least 65 mole percent of the fluoromonomer units are vinylidene fluoride (VDF) and is a homopolymer or random copolymer, and from 0.1 to 25 weight percent of a low molecular weight functional chain transfer agent, based on the total amount of monomer, wherein said low molecular weight functional chain transfer agent comprises at least one low molecular weight functional chain transfer agent selected from the group consisting of polylactic acid and polymaleic acid, said chain transfer agent has a weight average molecular weight of less than 20,000, and wherein said fluoromonomer units are selected from the group consisting of vinylidene fluoride (VDF), vinyl fluoride (VF), trifluoroethylene, tetrafluoroethylene (TFE), chlorotrifluoroethylene (CTFE) and hexafluoropropylene (HFP), 3,3,3-trifluoropropene, 2,3,3,3-tetrafluoropropene, and mixtures thereof.

* * * * *